(12) United States Patent
Peng et al.

(10) Patent No.: US 12,013,573 B2
(45) Date of Patent: Jun. 18, 2024

(54) OPTICAL RESONATING DEVICE HAVING MICRORING RESONATOR PHOTODIODE

(71) Applicant: Hewlett Packard Enterprise Development LP, Houston, TX (US)

(72) Inventors: Yiwei Peng, Milpitas, CA (US); Yuan Yuan, Milpitas, CA (US); Zhihong Huang, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/812,554

(22) Filed: Jul. 14, 2022

(65) Prior Publication Data

US 2024/0019637 A1 Jan. 18, 2024

(51) Int. Cl.
| | |
|---|---|
| G02B 6/12 | (2006.01) |
| G02B 6/125 | (2006.01) |
| G02B 6/293 | (2006.01) |
| G02F 1/015 | (2006.01) |
| G02B 6/122 | (2006.01) |

(52) U.S. Cl.
CPC ..... *G02B 6/29338* (2013.01); *G02B 6/12004* (2013.01); *G02B 6/125* (2013.01); *G02B 6/29343* (2013.01); *G02F 1/015* (2013.01); *G02B 6/1225* (2013.01); *G02F 2201/58* (2013.01)

(58) Field of Classification Search
CPC .. G02B 6/12004; G02B 6/1225; G02B 6/125; G02B 6/29338; G02B 6/29343; G02F 1/015; G02F 2201/58
See application file for complete search history.

(56) References Cited

U.S. PATENT DOCUMENTS

| | | | |
|---|---|---|---|
| 9,134,169 B2 * | 9/2015 | Li | G01J 1/0209 |
| 9,490,385 B2 * | 11/2016 | Huang | H01L 31/028 |
| 9,939,586 B2 * | 4/2018 | Timurdogan | G02B 6/122 |

FOREIGN PATENT DOCUMENTS

| | | |
|---|---|---|
| CN | 105629625 A | 6/2016 |
| CN | 106371174 A | 2/2017 |
| CN | 113484955 A | 10/2021 |
| CN | 215896649 U | 2/2022 |
| WO | 2012/025863 A1 | 3/2012 |

* cited by examiner

*Primary Examiner* — Ryan A Lepisto
(74) *Attorney, Agent, or Firm* — Hewlett Packard Enterprise Patent Department

(57) ABSTRACT

Examples described herein relate to an optical resonating device. The optical resonating device includes a primary waveguide, a microring resonator, and a microring resonator photodiode. The primary waveguide allows a passage of an optical signal. The microring resonator is formed adjacent to the primary waveguide to couple therein a portion of the optical signal passing through the primary waveguide. Furthermore, the microring resonator photodiode is formed adjacent to the microring resonator to measure an intensity of the portion of the optical signal coupled into the microring resonator.

16 Claims, 7 Drawing Sheets

OPTICAL RESONATING DEVICE HAVING MICRORING RESONATOR PHOTODIODE

STATEMENT OF GOVERNMENT RIGHTS

This invention was made with Government support under Agreement Number H98230-18-3-0001. The Government has certain rights in the invention.

BACKGROUND

Optical systems include optical devices that can generate, process, and/or carry optical signals from one point to another point. In certain implementations, optical systems such as optical communication systems may facilitate data communication over longer distances with higher bandwidth using smaller cable width (or diameter) in comparison to communication systems using electrical wires. In an optical communication system, light may be generated by a light source such as a laser. The light may be modulated by an optical transmitter, and demodulated by an optical receiver that includes photosensitive devices, for example. Also, certain optical systems entail the use of optical resonating devices to implement optical modulators, a ring laser, or a ring filter.

During the operation of the optical systems, it is often useful to monitor optical signals flowing through the optical devices. Techniques using photodiodes and surface state absorption have been implemented in conventional optical systems to measure the optical signals. However, the use of such monitoring techniques limits one or both of the bandwidth and optical power of the optical devices used in the optical systems. This in turn limits the high-speed operation of the optical systems.

BRIEF DESCRIPTION OF THE DRAWINGS

Various examples will be described below with references to the following figures.

Figure 1:
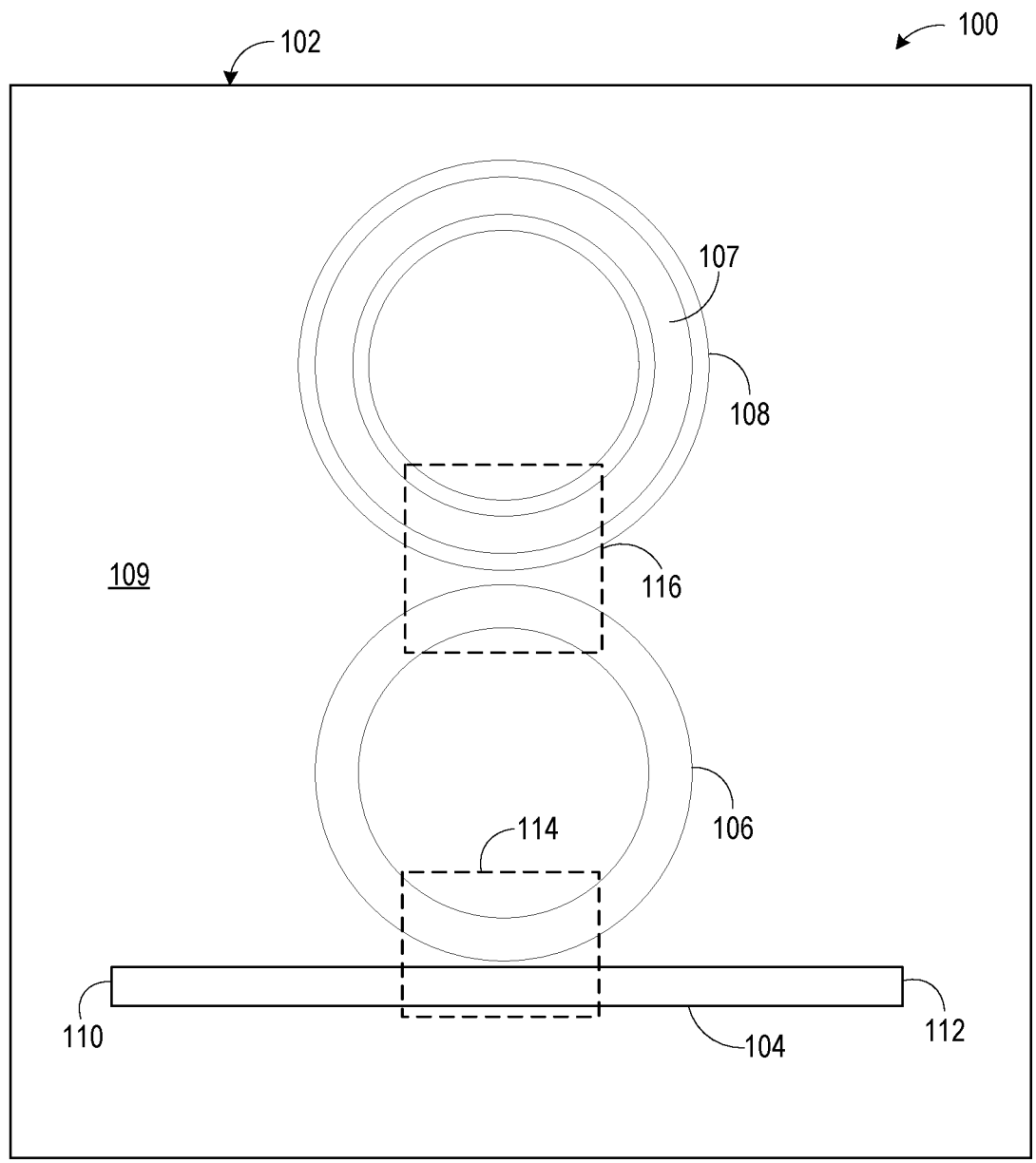
FIG. 1 depicts a top view of an example optical resonating device.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Demand for broadband communications has soared due to technological advancements in the way people consume data in a day-to-day life. Such a demand for broadband communications has led to an increase in the data communication bandwidth requirements resulting in the research and development of high-speed photonic interconnects to keep the data communication bandwidth scalable. Silicon photonics technology is considered an attractive solution for photonic interconnects due to its low cost and high miniaturization, where high-speed optical systems (for example, optical receivers) are employed.

Many optical systems entail the use of optical resonating devices to implement optical modulators, a ring laser, a ring filter, etc. Typically, an optical resonating device includes a microring waveguide (hereinafter referred to as a microring resonator) and a coupling waveguide, also sometimes referred to as a primary waveguide. The microring resonator is formed adjacent to the primary waveguide so that a portion of the optical signal passing through the primary waveguide is coupled into the microring resonator. At a resonant wavelength of the microring resonator, the optical signal interferes constructively inside the microring resonator. A resonant wavelength of the microring resonator is a function of an effective refractive index of the ring waveguide. A desired resonant wavelength may be achieved by tuning the effective refractive index of the microring resonator.

During the operation of the optical systems, the resonant wavelength may be tuned via thermal tuning mechanisms, for example, via resistive heating techniques while monitoring the resonant wavelength of the microring resonator. The resonant wavelength is generally monitored by measuring the intensity of the optical signal inside the microring resonator. Therefore, it is useful to monitor optical signals passing through the optical devices such as the optical resonating devices. Such monitoring of the light may be useful in adjusting certain operational parameters, for example, biasing conditions in the presence of changing environmental conditions or aging of the optical resonating devices.

Systems to monitor the resonant wavelength commonly use a drop port that is optically coupled to the microring resonator to obtain, at the drop port, at least a portion of the optical signal contained in the microring resonator. In certain traditional implementations, a drop bus waveguide including one or more drop ports is optically coupled to the microring resonator, such that at least a portion of the optical signal contained in the microring resonator is received at the drop port. One or more photodiodes, hereinafter referred to as external photodiodes, are installed at the drop port to aid in the monitoring of the optical signal received at the drop port. Use of the drop port entails transmitting at least a portion of the light out of the ring microring resonator, in particular, out of the microring resonator, which introduces power loss. This in turn reduces the Q-factor (e.g., a ratio of an optical power stored/confined within a microring resonator.

Further, the amount of photons absorbed by the external photodiode depends on the material(s) used to form the external photodiodes. In particular, for a photon to be absorbed by the photodiodes, the photon energy needs to be higher than an energy bandgap of the material receiving the photon. For example, for silicon-based microring resonators, the bandgap of about 1.12 eV may be too wide an energy bandgap to absorb photons with longer wavelengths, for example, wavelengths typically used in telecommunication applications, for example, from about 1300 nanometers (nm) to about 1600 nm. Therefore, typically, a narrow bandgap semiconductor material, such as germanium, is used to form a photodiode to detect such wavelengths. Some known implementations also entail a heterogeneous integration of Ill-V semiconductor materials with a narrow bandgap over a silicon substrate to measure the light. Due to process steps for epitaxial growth of germanium and/or the heterogeneous integration of Ill-V semiconductor materials on the silicon, fabrication of the optical resonating devices involves additional fabrication steps, time, and cost.

Further, some research suggested the use of sub-bandgap absorption by creating deep-level defects in silicon to aid in the measurement of light. However, the creation of such deep-level defects in silicon requires additional ion or dopant implantation resulting in overall complex and multi-step fabrication processes. Yet another research suggested the use of a surface states absorption (SSA) technique that entails absorbing the photons at surface irregularities thereby generating a current indicative of the optical signal inside the waveguide. However, the use of the SSA technique requires overlap between the surface irregularities and the optical mode resulting in low detection efficiency.

Further, in some implementations, optical resonating devices may include a primary waveguide and a single microring resonator, wherein the microring resonator integrates therein a photodiode to measure the optical signal coupled into the microring resonator. The photodiode integrated with the microring resonator is, hereinafter referred to as a microring resonator integrated photodiode. In some instances, the microring resonator integrated photodiode uses photon-assisted tunneling (PAT) mechanism to measure optical signals. However, the PAT mechanism is observed to be weak in measuring light and such photodetectors suffer from low responsivity. The responsivity of a photodiode is a measure of optical-to-electrical conversion efficiency of a photodiode and is usually expressed by the value of the photocurrent (mA) generated for each milliwatt of the optical signal.

Also, in some implementations, the microring resonator integrated photodiode may be operated as an avalanche photodiode when a reverse bias of sufficient magnitude is applied to the microring resonator integrated photodiode. Operating the microring resonator integrated photodiode as an avalanche photodiode may have increased responsivity, however, such an implementation of the photodiode with the microring resonator has low bandwidth which is limited by the high cavity photon lifetime. The cavity photon lifetime is a time constant that defines a decay of energy in a cavity (e.g., in the microring resonator). A longer cavity photon lifetime reduces the bandwidth of the microring resonator.

In accordance with aspects of the present disclosure, an optical resonating device is presented that includes a double microring structure resulting in improved photodetection and is capable of being fabricated without requiring additional process steps such as the epitaxial growth of germanium and/or the heterogeneous integration of III-V semiconductor materials on the silicon. In particular, the proposed optical resonating device includes a primary waveguide, a microring resonator, and a microring resonator photodiode. During the operation of the optical resonating device, the primary waveguide may allow passage of an optical signal therethrough. The microring resonator is formed adjacent to the primary waveguide to couple therein a portion of the optical signal passing through the primary waveguide. In some examples, the primary waveguide, the microring resonator, and the microring resonator photodiode are formed using Silicon and no Germanium and/or a type Ill-V semiconductor material are required to be used. Further, in some examples, the primary waveguide and the microring resonator are undoped.

The microring resonator photodiode (e.g., an annular waveguide photodiode which is separate from the microring resonator) is formed adjacent to the microring resonator to measure the intensity of the portion of the optical signal coupled into the microring resonator. In some examples, the microring resonator photodiode may have an annular waveguide that includes a PN junction or a P-I-N junction formed along its annulus. The annular waveguide may be operated with an application of a reverse bias voltage. In some examples, the reverse bias voltage may be adjusted to a sufficient magnitude to cause avalanche breakdown in the annular waveguide causing the operation of the microring resonator photodiode as an avalanche photodiode resulting in enhanced responsivity. Since the microring resonator photodiode is separate from the microring resonator, the operation of the microring resonator is not impacted by the measurement of the light via the microring resonator photodiode.

Additionally, in some examples, the proposed optical resonating device may include separate wavelength tuning mechanisms for the microring resonator photodiode and the microring resonator. In particular, the optical resonating device includes a first heater formed over the microring resonator to tune the wavelength of the portion of the optical signal coupled into the microring resonator. Also, the optical resonating device includes a second heater formed over the microring resonator photodiode to tune a light coupled into the microring resonator photodiode.

As will be appreciated, the proposed microring resonator photodiode is capable of measuring optical signal over increased bandwidth and provides higher output power in comparison to conventional waveguide integrated photodiodes achieving high bandwidth. In an example implementation, wherein the diameters of the microring resonator and the annular waveguide (e.g., an annular waveguide having a PN junction) are designed to be 7.5 micrometers and a coupling coefficient between the microring resonator and the primary waveguide is 26%, the microring resonator photodiode may achieve 3 dB bandwidth for about 70 Gigahertz (GHz) frequency range. This allows the proposed optical resonating device to be used in a high-speed receiver, and thus enables high-density data transmission.

Further, as a measurement of light is enabled via a separate microring resonator photodiode, the microring resonator photodiode is capable of wavelength-selective photodetection. Furthermore, in comparison to the conventional waveguide integrated photodiodes, the proposed microring resonator photodiode that is implemented separately from the microring resonator has sharper roll-off and lower channel crosstalk when multiple such microring resonator photodiode and microring resonator pairs are adjacently formed in the optical resonating device. In particular, compared to conventional waveguide integrated photodiodes, the proposed microring resonator photodiode may achieve more than 50% improvement on the channel crosstalk for channel spacing from 100 GHz to 200 GHz. As such, the proposed microring resonator photodiode measures the optical signal over a broader frequency spectrum in comparison to conventional device structures having a single microring resonator. Such a broadband spectrum and low channel distortion make the proposed optical resonating device suitable for application in Dense Wavelength-Division Multiplexing (DWDM) receiver.

Further, the proposed optical resonating device with the microring resonator photodiode may be fabricated without performing additional processes such as epitaxial growth of germanium and/or the heterogeneous integration of Ill-V semiconductor materials on the silicon resulting in mainly a silicon-based device structure. No need for epitaxial growth of germanium and/or the heterogeneous integration of III-V semiconductor materials can decrease the material costs and process complexity.

Referring now to the drawings, FIG. 1 depicts a top view 100 of an example optical resonating device 102. The optical resonating device 102 may be a semiconductor-based optical microring device suitable for several applications such as, but not limited to, a ring modulator, a ring laser, and a ring filter. The optical resonating device 102 and/or the devices using such optical resonating device 102 may be deployed in an electronic system such as a system that may include processing resources, electronic circuits, and/or storage media to process and/or store data. Examples of the electronic system that may use such optical resonating device 102 may include, but are not limited to, computers (stationary or portable), servers, storage systems, wireless access points, network switches, routers, docking stations, printers, or scanners. Such an electronic system may be offered as a stand-alone product, a packaged solution, and can be sold on a one-time full product/solution purchase or on a pay-per-use basis.

The optical resonating device 102 may include a primary waveguide 104, a microring resonator 106, and a microring resonator photodiode 108 form on a semiconductor substrate 109. In some examples, the semiconductor substrate 109 may be a silicon on insulator (SOI) or silicon substrate. The primary waveguide 104 is formed sufficiently close to the microring resonator 106 to provide evanescent coupling of light therebetween through a first coupling region 114. The primary waveguide 104 may include an input port 110 and an output port 112. An optical signal may be supplied to the optical resonating device 102 via the input port 110 and a signal having a wavelength equal to a resonant wavelength of the microring resonator 106 may be coupled into (e.g., trapped inside) the microring resonator 106.

In addition, the microring resonator photodiode 108 may include an annular waveguide 107 and is formed adjacent to and sufficiently close to the microring resonator 106 to provide evanescent coupling of the light between the microring resonator photodiode 108 and the microring resonator 106 through a second coupling region 116. The annular waveguide 107 may include a PN junction or a P-I-N junction along its annulus. In some examples, the microring resonator 106 and the annular waveguide 107 may have the same dimensions (e.g., have the same geometrical shapes) and/or are tunable (e.g., using thermal heating techniques) to have substantially similar or the same resonant wavelengths. Also, for illustration purposes, the microring resonator 106 and the microring resonator photodiode 108 are shown to have a circular shape. In some examples, the microring resonator 106 and the microring resonator photodiode 108 may have any other shapes, for example, a loop of any shape (e.g., oval loop, rounded rectangle loop, rounded square loop, rounded triangle loop, etc.) without limiting the scope of the present disclosure. By way of example, the microring resonator 106 and the microring resonator photodiode 108 may have an elongated loop shape or an elongated oval shape (e.g., a racetrack shape).

During the operation of the optical resonating device 102, the light trapped in the microring resonator 106 may be coupled into the microring resonator photodiode 108. In particular, in some examples, as the microring resonator 106 and the microring resonator photodiode 108 have the same resonant wavelengths, the light trapped inside the microring resonator 106 is also trapped in the microring resonator photodiode 108. The microring resonator photodiode 108 may be operated with an application of a reverse bias voltage to enable measurement of the intensity of the light coupled therein from the microring resonator 106. On the application of the reverse bias voltage, the microring resonator photodiode 108 generates a current that is proportional to the intensity of the light trapped inside the microring resonator photodiode 108. Because the wavelength of the microring resonator photodiode 108 is the same and/or tunable to match that of the microring resonator 106, the microring resonator photodiode 108 may be used for wavelength selective light measurements.

Also, in some examples, the primary waveguide 104, the microring resonator 106, and the microring resonator photodiode 108 are formed using a single semiconductor base material, for example, Silicon. As such, in some example implementations, the primary waveguide 104, the microring resonator 106, and the microring resonator photodiode 108 may not include a layer or region formed using any material (e.g., Germanium or a type III-V semiconductor material) other than the base material. Advantageously, the proposed optical resonating device 102 is capable of being fabricated without requiring additional process steps such as the epitaxial growth of germanium and/or the heterogeneous integration of III-V semiconductor materials on the silicon thereby decreasing the material costs and process complexity.

Figure 2A:
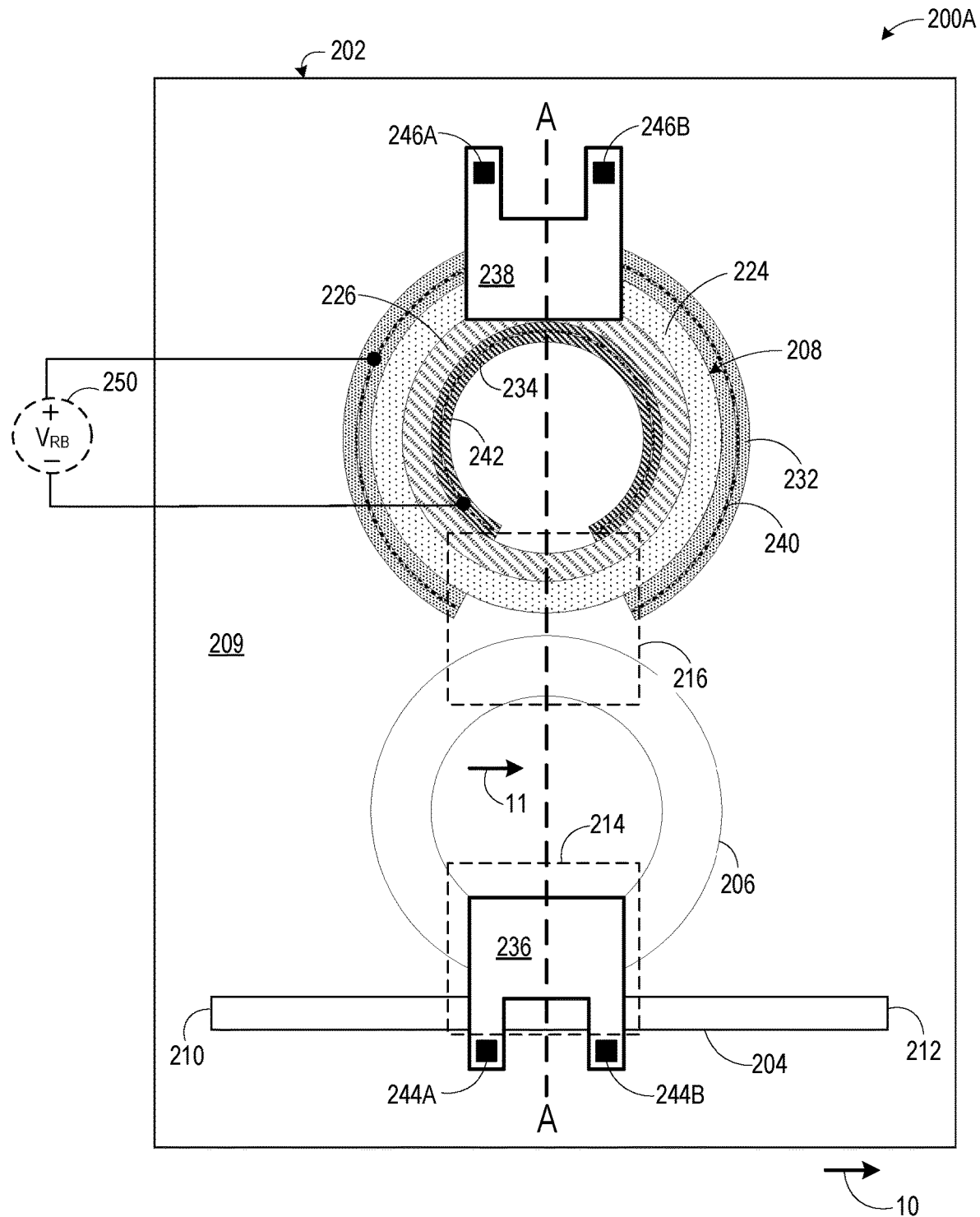
FIG. 2A depicts a top view of another example optical resonating device.
Figure 2B:
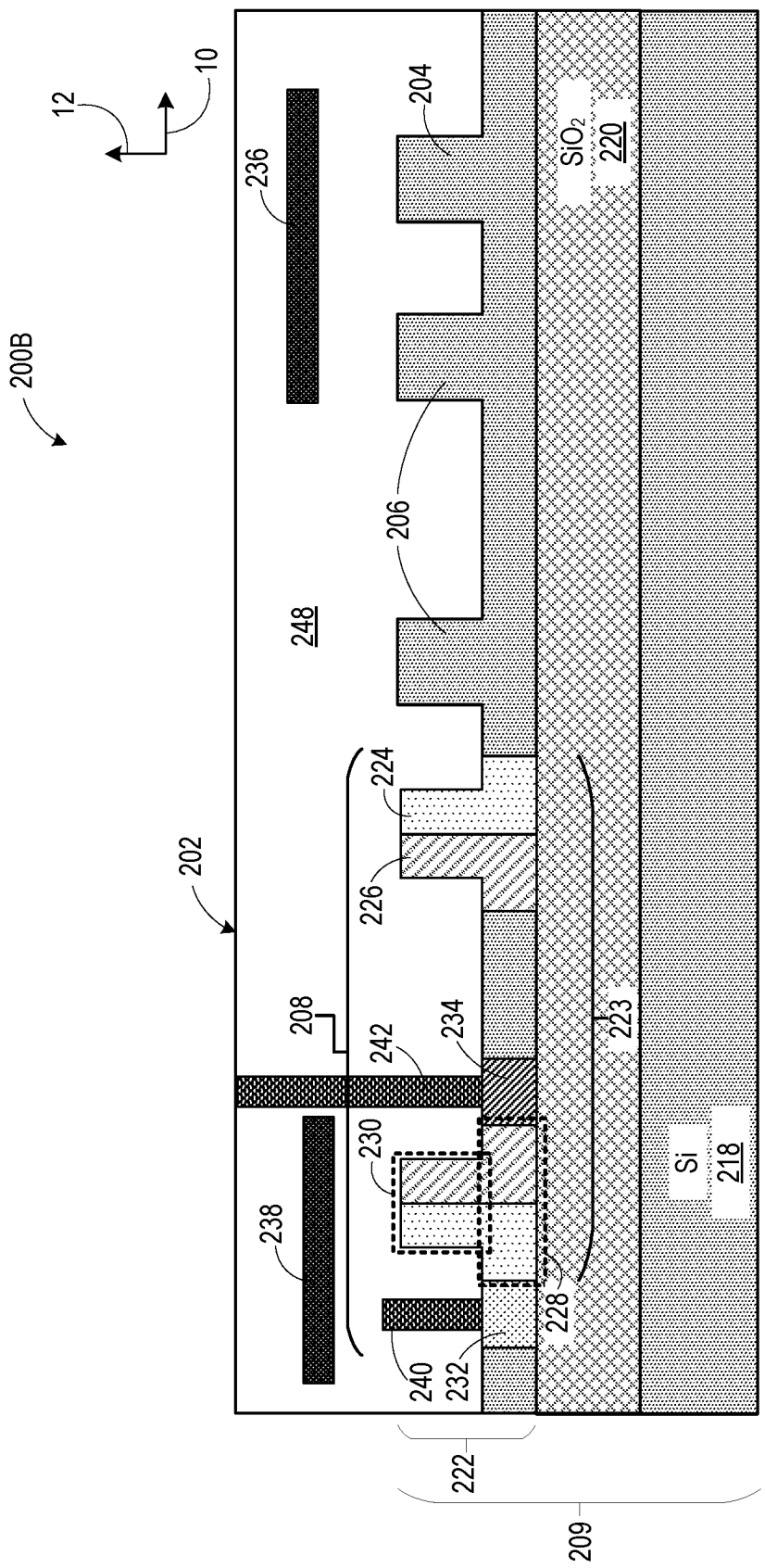
FIG. 2B depicts a cross-sectional view of the optical resonating device of FIG. 2A.

Referring now to FIGS. 2A and 2B, a top view 200A and a cross-sectional view 200B of another example optical resonating device 202 are depicted. The optical resonating device 202 is an example representative of the optical resonating device 102 of FIG. 1. In particular, the cross-sectional view 200B depicts a cross-section of the optical resonating device 202 taken at a location A-A of the optical resonating device 202 marked in FIG. 2A and can be seen in a direction 11. Further, in FIGS. 2A and 2B, arrows 10 and 12 show a radial direction and a vertical direction (hereinafter referred to as "radial direction 10" and "vertical direction 12"). In the description hereinafter, FIGS. 2A and 2B are generally referenced concurrently in the description hereinafter and similar reference numerals are used for identical regions/layers. For clarity of representation, certain regions/layers of the optical resonating device 202 shown in the cross-sectional view 200B are not depicted in the top view 200A.

Like the optical resonating device 102 of FIG. 1, the optical resonating device 202 also includes a primary waveguide 204, a microring resonator 206, and a microring resonator photodiode 208. The primary waveguide 204 is formed sufficiently close to the microring resonator 206 to provide evanescent coupling of light therebetween through a first coupling region 214. The primary waveguide 204 may include an input port 210 and an output port 212. An optical signal may be supplied to the optical resonating device 202 via the input port 210 and a signal having a wavelength equal to a resonant wavelength of the microring resonator 206 may be coupled into (e.g., trapped inside) the microring resonator 206. The microring resonator photodiode 208 is formed adjacent to and sufficiently close to the microring resonator 106 to provide evanescent coupling of the light between the microring resonator photodiode 108 and the microring resonator 106 through a second coupling region 216.

The primary waveguide 204, the microring resonator 206, and the microring resonator photodiode 208 may be formed in a common a semiconductor substrate 209. In some examples, the semiconductor wafer 209 may be a silicon on insulator (SOI) substrate that may include a base substrate layer 218, a base oxide layer 220, and a device layer 222. The base substrate layer 218 may be made of semiconductor material, for example, silicon (Si). Other examples of materials that may be used to form the base substrate layer 218 may include III-V semiconductors, such as indium phosphide (InP), germanium (Ge), gallium arsenide (GaAs), aluminum gallium arsenide (AlGaAs), indium gallium arsenide (InGaAs), indium arsenide (InAs), or combinations thereof.

The base oxide layer 220 may be formed by oxidizing the base substrate layer 218. In the implementation of the optical resonating device 202, for the base substrate layer 218 made of silicon, the base oxide layer 220 may comprise silicon dioxide ($SiO_2$), which may be formed in the presence of oxygen at a temperature in the range from 900° C. to 1380° C. In some examples, the base oxide layer 220 may be a buried oxide (BOX) layer (e.g., the $SiO_2$ may be buried in the base substrate layer 218). In some examples, a layer of the $SiO_2$ may be buried in the base substrate layer 218 at a depth ranging from less than 100 nm to several micrometers from the wafer surface depending on the application. Other examples of the base oxide layer 220 may include, but are not limited to, Silicon Nitride ($Si_3N_4$), Aluminum oxide ($Al_2O_3$), Hafnium Dioxide ($HfO_2$), diamond, silicon carbide (SiC), or combinations thereof.

The device layer 222 may be formed on top of the base oxide layer 220. In the example implementation of FIG. 2, the device layer 222 is composed of silicon. The device layer 222 may be suitably shaped (e.g., via techniques such as photolithography and etching) to form one or more regions, such as, the microring resonator 206, the primary waveguide 204, the microring resonator photodiode 208.

Also, for illustration purposes, the microring resonator 206 and the microring resonator photodiode 208 are shown to have circular shapes (FIG. 2A). In some examples, the microring resonator 206 and the microring resonator photodiode 208 may have any other shapes, for example, a loop of any shape (e.g., oval loop, rounded rectangle loop, rounded square loop, rounded triangle loop, etc.) without limiting the scope of the present disclosure. By way of example, the microring resonator 206 and the microring resonator photodiode 208 may have an elongated loop shape or an elongated oval shape (e.g., a racetrack shape). The microring resonator 206 and the primary waveguide 204 are formed by lithographically defining respective shapes on the device layer 222 and then etching out the portions of the device layer 222 according to the defined shapes. In an example, both the microring resonator 206 and the primary waveguide 204 are kept undoped.

The microring resonator photodiode 208 may include an annular waveguide. In the example implementation of the optical resonating device 202, the microring resonator photodiode 208 is shown to include a PN junction annular waveguide 223. The PN junction annular waveguide 223 may include a first annular region 224 (hereinafter referred to as an outer annular region 224) and a second annular region 226 (hereinafter referred to as an inner annular region 226). In some examples, as depicted in FIGS. 2A and 2B, the outer annular region 224 may be formed in contact with and annularly surrounding the inner annular region 226 outwardly in the radial direction 10 thereby forming a PN junction along the annulus. In certain other examples, the microring resonator photodiode 208 may include a P-I-N junction annular waveguide (not shown) that includes an intrinsic region (e.g., undoped silicon) between an outer annular region and an inner annular region. Both the outer annular region 224 and the inner annular region 226 may be formed of the same material (e.g., Si), but are differently doped. For example, the outer annular region 224 may have a first-type doping, and the inner annular region 226 may have a second-type doping. The second-type doping is different from the first-type doping. For illustration purposes, the first-type doping is described as N-type and the second-type doping is described as P-type. In other examples, the first-type doping may be P-type and the second-type doping may be N-type. For illustration purposes, the outer annular region 224 is shown to include the first-type (i.e., N-type) doping, and the inner annular region 226 is to include the second-type (i.e., P-type) doping. In some examples, the doping densities of the N-type doping and P-type doping are set to $1\times10^{18}$ cm$^{-3}$ and $8\times10^{17}$, respectively, in the outer annular region 224 and the inner annular region 226.

In some examples, the microring resonator photodiode 208 may be shaped to have a waveguide base 228 and a waveguide core 230 that is narrower than the waveguide base 228. The outer annular region 224 and the inner annular region 226 are shaped accordingly to the desired overall shape of the microring resonator 206. For example, the outer annular region 224 may have an L-shaped cross-section (see FIG. 2B). In this example, the inner annular region 226 may have a mirrored L-shaped cross-section (see FIG. 2B). In particular, the waveguide core 230 may include the combined region formed by the upper regions of the annular regions 224, 226, respectively. Similarly, the waveguide base 228 may include the combined region formed by lower regions of the annular regions 224, 226, respectively. Because the upper regions of the annular regions 224, 226 are thinner than the lower regions of the annular regions 224, 226, the waveguide core 230 is narrower than the waveguide base 228. Accordingly, during the operation of the optical resonating device 202, the confined mode may be located mainly within the waveguide core 230. In some other examples, the microring resonator 206 may have different cross-sections, for example, a square or a rectangular cross-section, and does not have a differently shaped waveguide core and waveguide base.

Furthermore, in some examples, as depicted in FIGS. 2A and 2B, the microring resonator photodiode 208 may include one or more contact regions, for example, a first contact region (hereinafter referred to as an outer contact region 232) and a second contact region (hereinafter referred to as an inner contact region 234). The contact regions 232, 234 are formed in the device layer 222 by suitably shaping (e.g., etching) the device layer 222 and performing impurity doping as indicated with reference to the contact regions 232, 234. The outer contact region 232 may be formed in contact with at least a portion of the outer annular region 224. In particular, the outer contact region 232 may be formed in contact with a portion of an outer annular boundary of the waveguide base 228. Similarly, the inner contact region 234 may be formed in contact with at least a portion of the inner annular region 226. In particular, the inner contact region 234 may be formed in contact with a portion of an inner annular boundary of the waveguide base 228. In some examples, the microring resonator photodiode 208 may not include the contact regions 232, 234 in the second coupling region 216.

In some examples, the outer contact region 232 may include the first-type doping, and the inner contact region 232 may include the second-type doping. Accordingly, in the cross-sectional view 200B examples of FIG. 2B, the contact regions 232 and 234 are shown to include the N-type doping and the P-type doping, respectively. In some examples, the contact regions 232 and 234 may have a higher concentration of respective doping in comparison to doping concentrations in the annular regions 224 and 226 of the microring resonator photodiode 208. Accordingly, the contact regions 232 and 234 may be considered highly doped regions and are marked with labels "n++" and "p++" as depicted in FIG. 2B. In some examples, the outer annular region 224 and the inner annular region 226 may not be as highly doped and are marked with "n" and "p," respectively. Accordingly, the outer annular region 224 and the inner annular region 226 may be referred to as lightly doped regions.

Further, to allow controlled tuning of the resonant wavelength of the light inside the microring resonator 206 and the microring resonator photodiode 208, the optical resonating device 202 may include thermal elements, for example, a first heater 236 and a second heater 238. In some examples, the first heater 236 and the second heater 238 are metal heaters and are formed near the microring resonator 206 and microring resonator photodiode 208, respectively. In particular, the first heater 236 may be formed over at least a portion of the microring resonator 206 to tune the resonant wavelength of the light inside the microring resonator 206 based on an application of a voltage to the first heater 236. Similarly, the second heater 238 may be formed over at least a portion of the microring resonator photodiode 208 to tune the resonant wavelength of the light inside the microring resonator photodiode based on an application of another voltage to the second heater 238. Formation of the heater 236 and 238 on top of the microring resonator 206 and the microring resonator photodiode 208, respectively, may help in achieving enhanced thermal tuning. Also, due to the use of the separate heaters 236 and 238 from the microring resonator 206 and the microring resonator photodiode 208, no additional doping regions are needed to be created inside the microring resonator 206 and the microring resonator photodiode 208.

Moreover, in some examples, the optical resonating device 202 may include metal contacts, such as, a first metal contact 240 and a second metal contact 242 formed in contact with the outer contact region 232 and the inner contact region 234, respectively. Further, the optical resonating device 202 may include additional metal contacts 244A, 244B, 246A, and 246B. The metal contacts 244A and 244B are formed in contact with the first heater 236 to apply a voltage across the first heater 236. Similarly, the metal contacts 246A and 246B are formed in contact with the second heater 238 to apply another voltage across the second heater 238.

In some examples, the optical resonating device 202 may include an electrically insulating layer 248 formed over the exposed surfaces of the microring resonator 206, the microring resonator photodiode 208, and the heater 236, 238. Examples of the electrically insulating layer 248 may include $SiO_2$, $Si_3N_4$, $Al_2O_3$, $HfO_2$, polyimide, BCB, or the like. In some examples, the metal contacts 240, 242, 244A, 244B, 246A, and 246B are formed on top of (i.e., vertically over) respective regions such as the contact regions 232, 234, and the heaters 236, 238. In some examples, to form the metal contacts 240, 242, 244A, 244B, 246A, and 246B the electrically insulating layer 248 may be etched or lithographically defined to form respective vias until the respective regions such as the contact regions 232, 234, and the heaters 236, 238 are reached. Once the vias are formed, a conducting material (e.g., metal) is filled into the vias to form the metal contacts 240, 242, 244A, 244B, 246A, and 246B. Examples of materials used to form the metal contacts 240, 242, 244A, 244B, 246A, and 246B may include, but are not limited to, Copper (Cu), Gold (Au), Al, Platinum (Pt), and the like.

During operation, the microring resonator photodiode 208 may be operated by applying a reverse bias voltage ($V_{RB}$) across the contact regions 232, 234. To apply the reverse bias voltage ($V_{RB}$) across the contact regions 232, 234 of the microring resonator photodiode 208, an external power source 250 may be electrically connected to the metal contacts 240 and 242 (see FIG. 2A). On application of the reverse bias voltage, a depletion region around the PN junction between the annular regions 224, 226 increases in width and the PN junction may absorb light thereby generating current. This current may be indicative of the intensity of the light inside the PN junction annular waveguide 223 of the microring resonator photodiode 208. In some examples, the reverse bias voltage of sufficient magnitude (e.g., −6.5 V) can increase the probability of the PAT and may cause an avalanche breakdown (as will be described in greater detail in FIGS. 3A-3D), resulting in enhanced responsivity of the microring resonator photodiode 208. Further, in some examples, the heaters 236 and 238 may also be supplied with respective voltages to tune the resonant wavelengths of the microring resonator 206 and the microring resonator photodiode 208.

Figure 3A:
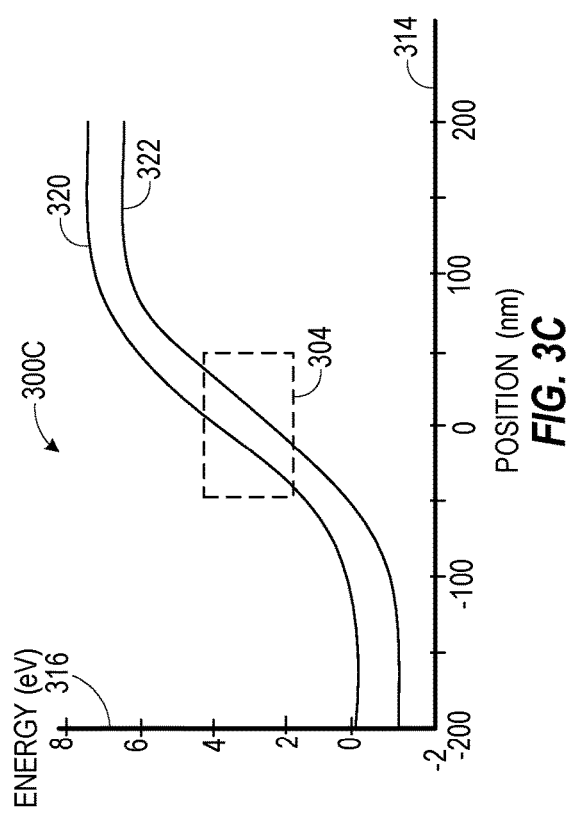
FIGS. 3A-3D depict graphical representations showing energy band structures for an example optical resonating device.
Figure 3C:
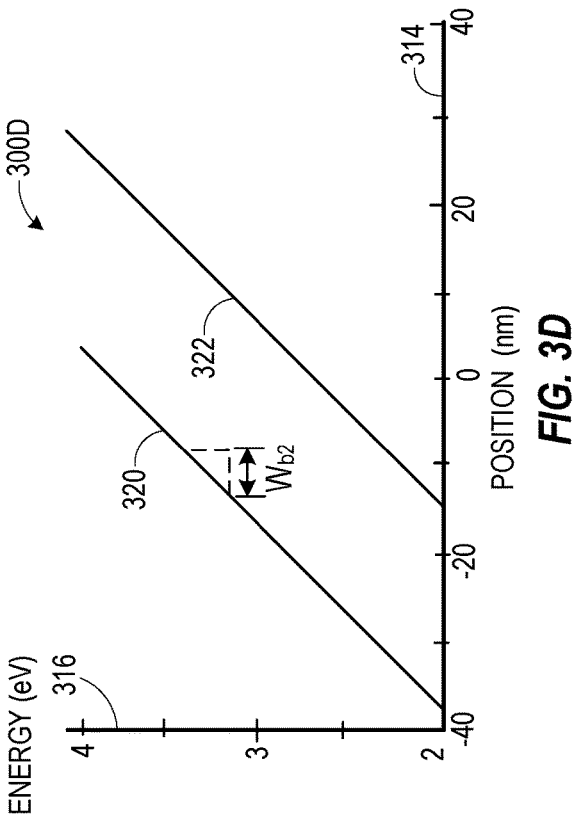
Figure 3B:
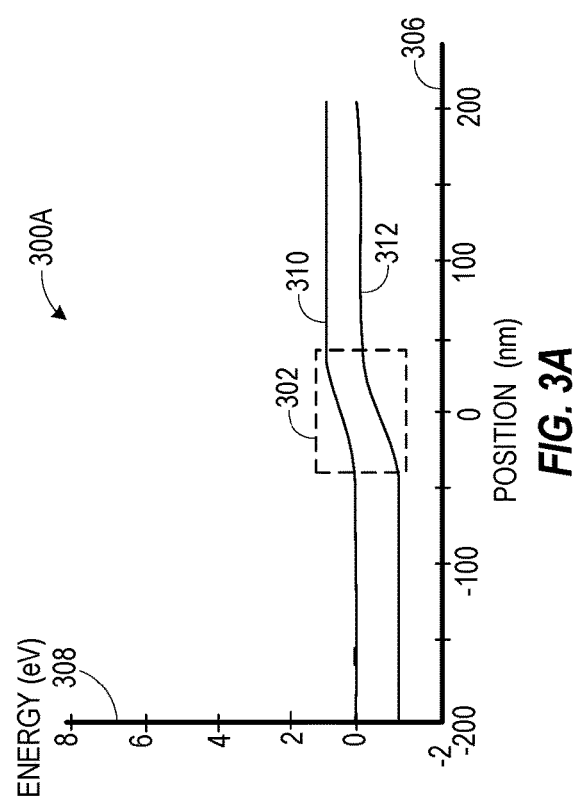
Figure 3D:
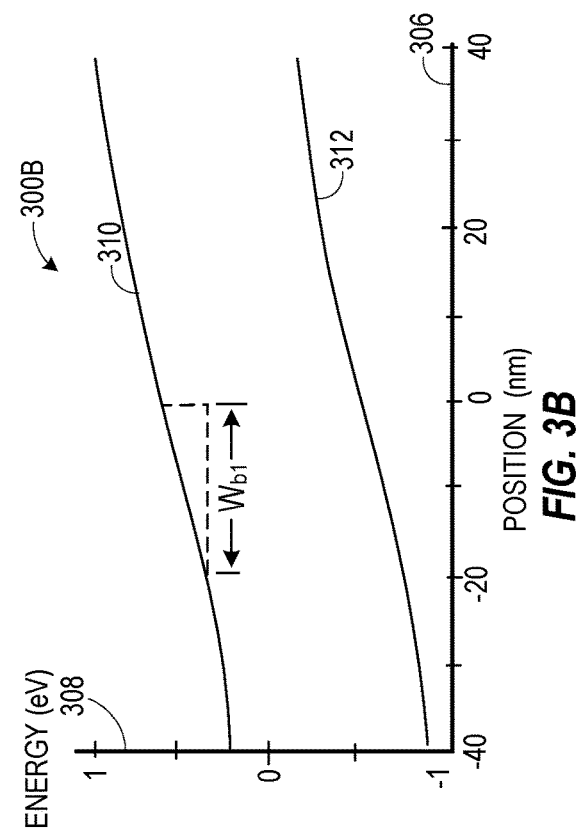

FIGS. 3A, 3B, 3C, and 3D depict graphical representations depicting energy band structures 300A, 300B, 3000, and 300D, respectively, for an example optical resonating device (e.g., the optical resonating device 202). In the energy band structures 300A-300D, the labels $E_V$ and $E_C$ represent energy levels of the valance band and conduction band, respectively. An energy difference between the conduction band energy level $E_C$ and the valance band energy level $E_V$ is hereinafter referred to as an energy bandgap $E_G$ which is indicative of energy required for a charge carrier (e.g., an electron) to become free by moving from the valance band to the conduction band. The energy band structure 300A of FIG. 3A can be realized when no reverse bias voltage is applied to the microring resonator photodiode 208 (i.e., $V_{RB}$=0 Volt). The energy band structure 300B of FIG. 3B is an enlarged representation of the section 302 of the energy band structure 300A of FIG. 3A. Accordingly, common reference numerals have been used in FIGS. 3A and 3B. Further, the energy band structure 3000 of FIG. 3C can be realized when a reverse bias voltage of sufficient magnitude (e.g., $V_{RB}$=−6.5 Volts) is applied to the microring resonator photodiode 208. The energy band structure 300D of FIG. 3D is an enlarged representation of the section 304 of the energy band structure 3000 of FIG. 3C. Accordingly, common reference numerals have been used in FIGS. 3C and 3D.

Referring now to FIGS. 3A and 3B, an X-axis 306 represents a position along a cross-sectional width in nanometers (nm) of the microring resonator photodiode 208, and a Y-axis 308 represents energy values in electron-volts (eV).

In particular, position 0 on the X-axis 306 represents a location on microring resonator photodiode 208 where the annular regions 224 and 226 contact each other. Further, the energy band lines 310 and 312 respectively represent conduction band energy level $E_C$ and the valance band energy level $E_V$ for the semiconductor material of the microring resonator photodiode 208. As will be understood, the energy band lines 310 and 312 may have different slopes depending on the electric field appearing across the depletion region in the PN junction between the annular regions 224 and 226 and material properties (e.g., doping concentration and/or lattice structure) of the annular regions 224 and 226. In particular, the electric field appearing across the depletion region of the PN junction is dependent on the magnitude of the reverse bias voltage applied to the microring resonator photodiode 208.

Referring now to FIGS. 3C and 3D, an X-axis 314 represents a position along a cross-sectional width of the microring resonator photodiode 208, and a Y-axis represents 316 energy values in electron-volts (eV). In particular, position 0 on the X-axis 314 represents a location on microring resonator photodiode 208 where the annular regions 224 and 226 contact each other. Further, the energy band lines 320 and 322 respectively represent conduction band energy level $E_C$ and the valance band energy level $E_V$ for the semiconductor material of the microring resonator photodiode 208. As can be observed from the energy band structures 300B and 300D, with the application of reverse bias voltage the slope of the energy band lines 320 and 322 in the energy band structure 300B near the position 0 is steeper compared to the one shown in the energy band structure 300B. This results in a reduced energy bandgap along the PN junction in the microring resonator photodiode 208. As such, the steep band structure shown in FIGS. 3C and 3D reduces an effective potential barrier width (e.g., $W_{b2} < W_{b1}$). The effective potential barrier width is a width along the radial direction in the depletion region of the PN junction in the PN junction annular waveguide 223 for unit energy. Reduction of the effective potential barrier width enables even lower energy photons to be absorbed by the PN junction. Accordingly, charge carriers (e.g., electrons and holes) can cross (e.g., tunnel through) such narrow potential barrier easily even upon absorbing low-energy photons, such phenomenon is commonly referred to as photon-assisted tunneling (PAT). As such, with the application of the higher second reverse bias voltage to the microring resonator photodiode 208, the probability of PAT increases exponentially.

Also, the application of the higher reverse bias voltage (e.g., −6.5 V) to the microring resonator photodiode 208, causes an impact ionization in the depletion region at the PN junction thereby generating additional free charge carriers (e.g., electrons and holes) in the depletion region. This results in an avalanche of free charge carriers, also commonly referred to as an avalanche effect. The avalanche effect further increases the responsivity (e.g., a measure of optical-to-electrical conversion efficiency) of the microring resonator photodiode 208. In particular, with the application of the higher reverse bias voltage and the increased PAT probability and/or the avalanche effect, even lower energy photons can be detected by the microring resonator photodiode 208 thereby achieving better photoconversion (e., converting photons to current) efficiency. In particular, the applied reverse bias voltage of about −6.5 V can cause the electric field at the PN junction to reach about $4.98 \times 10^7$ V/m which is high enough to generate impact ionization. In addition, the overlap area of the PN junction and optical mode is also increased and thus improving the light absorption. Such a high electric field at the PN junction and the overlap of the optical mode with the PN junction enhance the responsivity of the microring resonator photodiode 208.

Figure 4A:
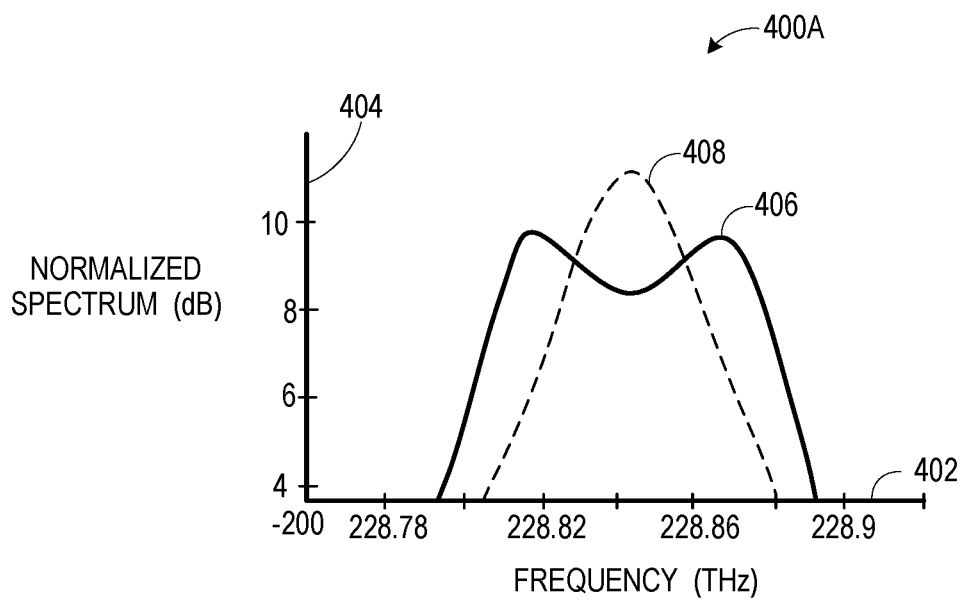
FIGS. 4A-4B depict spectral representations of optical power at different locations in an example optical resonating device.
Figure 4B:
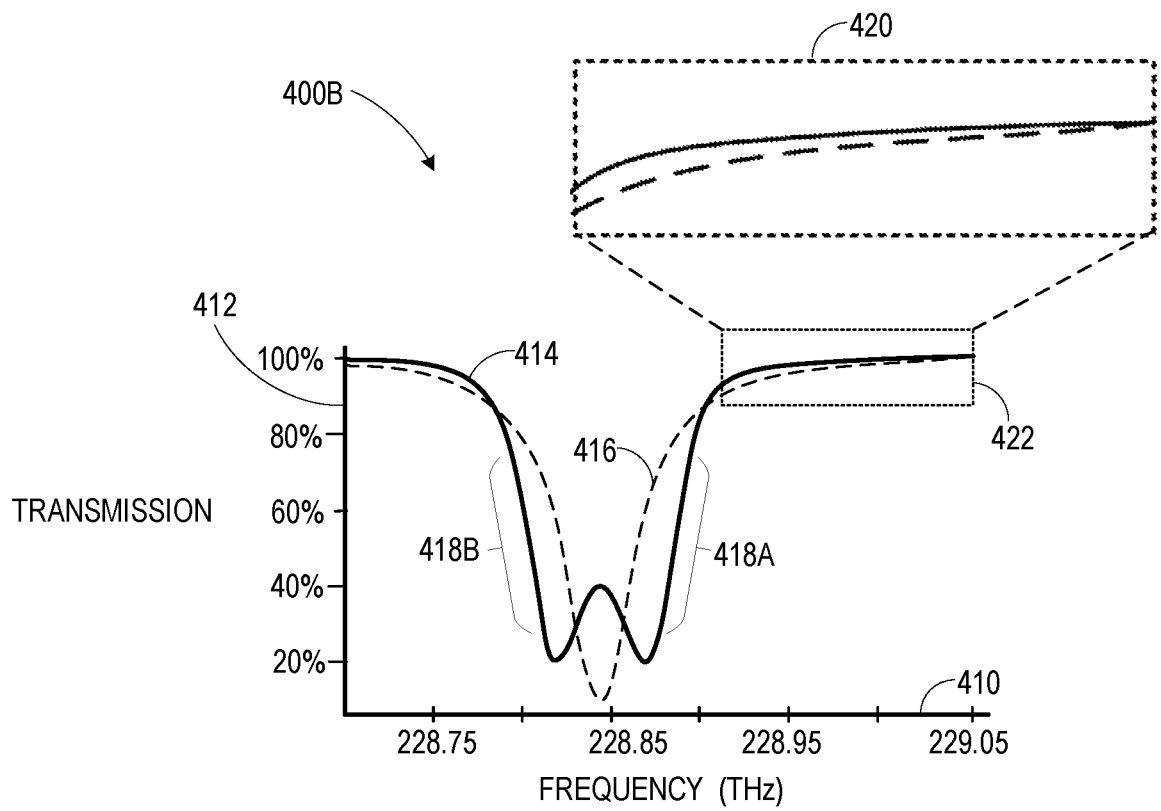

FIGS. 4A and 4B respectively depict spectral representations 400A and 400B of optical power at different locations in an example optical resonating device. The spectral representations 400A and 400B are simulated in Lumerical Interconnect.

In particular, the spectral representation 400A of FIG. 4A depicts a spectral representation of an optical power inside a microring resonator photodiode, such as, the microring resonator photodiode 208. In FIG. 4A, an X-axis 402 represents a frequency of an optical signal in Terahertz (THz), and a Y-axis 404 represents a normalized magnitude in decibels (dB). Further, a curve 406 (represented with a solid line and hereinafter referred to as microring resonator photodiode spectrum 406) represents a spectrum of the optical power inside the microring resonator photodiode 208. Further, a curve 408 (represented with a dashed line and hereinafter referred to as single microring resonator spectrum 408) represents a spectrum of an optical power inside a conventional waveguide integrated photodiode structure (i.e., single microring resonator structure wherein a photodiode is integrated within the same microring resonator unlike the double microring structure of FIGS. 1 and 2A). As depicted in FIG. 4A, the microring resonator photodiode spectrum 406 is much wider in comparison to the single microring resonator spectrum 408, which indicates that the microring resonator photodiode 208 can be used to measure light for higher bandwidth.

The spectral representation 400B of FIG. 4B depicts a spectrum of optical power at the output port, for example, the output port 212 of the primary waveguide, e.g., the primary waveguide 204. In FIG. 4B, an X-axis 410 represents the frequency of the optical signal in Terahertz (THz), and a Y-axis 412 represents a percentage of input optical power available at the output power. Further, a curve 414 (represented with a solid line and hereinafter referred to as a present transmission spectrum 414) represents a spectrum of the optical power at the output port 212 of the primary waveguide 204 of the optical resonating device 202. Further, a curve 416 (represented with a dashed line and hereinafter referred to as conventional transmission spectrum 416) represents a spectrum of the optical power at an output of a conventional optical resonating device with a single microring resonator structure. As depicted in FIG. 4B, the present transmission spectrum 414 has sharper band edges 418A, 418B compared to the conventional transmission spectrum 416.

Moreover, as depicted in the enlarged section 420 of section 422 of the representation 400B, the present transmission spectrum 414 reaches a target magnitude over a narrow frequency range as compared to the conventional transmission spectrum 416. Consequently, the example optical resonating device 202 is more efficient in avoiding interference with adjacent channels. In an example implementation, compared to conventional waveguide integrated photodiode structure, the optical resonating device 202 shows more than 50% improvement on the channel crosstalk for channel spacing from 100 GHz to 200 GHz. As such, the proposed microring resonator photodiode 208 measures the optical signal over a broader frequency spectrum in comparison to conventional device structures having a single microring resonator. In particular, the broadband spectrum (see FIG. 4A) and low channel distortion make example optical resonating device 202 suitable for applications in DWDM receiver application.

Figure 5:
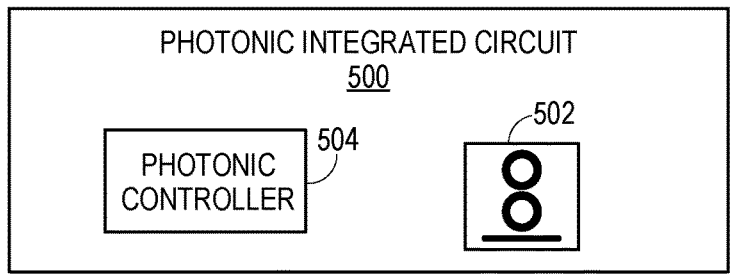
FIG. 5 depicts an example photonic integrated circuit including an example optical resonating device.

Referring now to FIG. 5, an example photonic integrated circuit 500 is depicted. The photonic integrated circuit 500 may include optical and electronic devices to process and/or communicate optical signals. In some examples, the photonic integrated circuit 500 may include one or more photonic devices such as an optical resonating device 502 and a photonic controller 504.

For illustration purposes, in FIG. 5, the photonic integrated circuit 500 is shown to include a single optical device such as the optical resonating device 502. The optical resonating device 502 may be an example representative of the optical resonating devices 102, 202 described in FIGS. 1 and 2A-2B. The use of a different number of optical devices or the use of several different types of optical devices in the photonic integrated circuit 500 is also envisioned within the scope of the present disclosure. For example, the photonic integrated circuit 500 may also include other photonic devices such as but not limited to, optical converters, optical cables, waveguides, optical modulators (e.g., ring modulator), optical demodulators (e.g., ring demodulator), resonators, light sources (e.g., lasers), and the like.

The photonic integrated circuit 500 may function as an optical receiver, optical transmitter, optical transceiver, optical communication and/or processing medium for the data and control signals received from the photonic controller 504. Non-limiting examples of the photonic controller 504 may be implemented using an IC chip such as, but not limited to, an application-specific integrated circuit (ASIC), a field-programmable gate array (FPGA) chip, a processor chip (e.g., central processing unit (CPU) and/or graphics processing unit (GPU)), a microcontroller, or a special-purpose processor. During the operation, the photonic controller 504 may send control and/or data signals to the optical resonating device 502 to control the operations of the optical resonating device 502.

Figure 6:
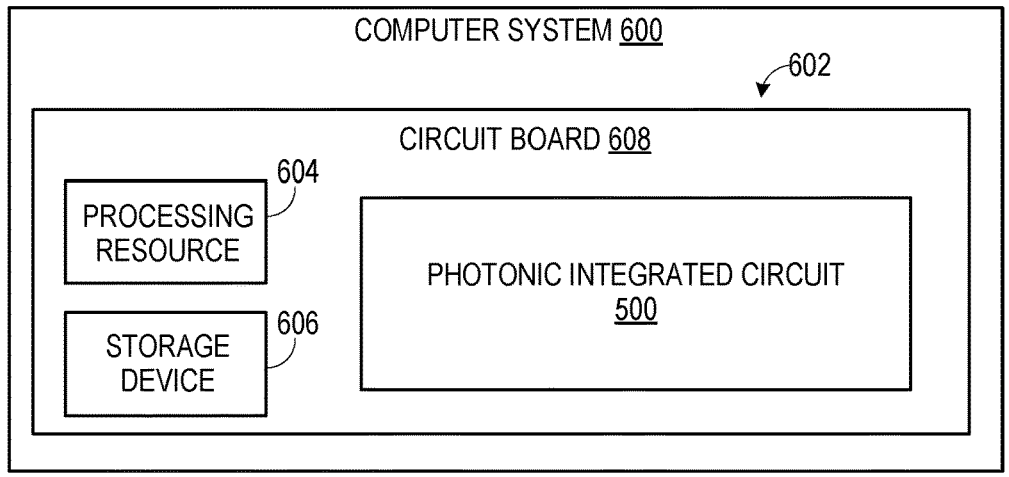
FIG. 6 depicts an example electronic system having the photonic integrated circuit of FIG. 5.

Referring now to FIG. 6, a block diagram of an example electronic system 600 is presented. Examples of the electronic system 600 may include, but are not limited to, computers (stationary or portable), servers, storage systems, wireless access points, network switches, routers, docking stations, printers, or scanners. The electronic system 600 may be offered as a stand-alone product, a packaged solution, and can be utilized on a one-time full product/solution purchase or pay-per-use basis. The electronic system 600 may include one or more multi-chip modules, for example, a multi-chip module (MCM) 602 to process and/or store data. In some examples, the MCM 602 may include a processing resource 604 and a storage medium 606 mounted on a circuit board 608. Also, in some examples, the MCM 602 may host a photonic integrated circuit 500 on the circuit board 608. In some other examples, one or more of the processing resource 604, the storage medium 606, and the photonic integrated circuit 500 may be hosted on separate MCM (not shown). The circuit board 608 may be a printed circuit board (PCB) that includes several electrically conductive traces (not shown) to interconnect the processing resource 604, the storage medium 606, and the photonic integrated circuit 500 with each other and/or with other components disposed on or outside of the PCB.

The processing resource 604 may be a physical device, for example, one or more CPUs, one or more semiconductor-based microprocessors, microcontrollers, GPUs, ASICs, FPGAs, other hardware devices, or combinations thereof, capable of retrieving and executing the instructions stored in the storage medium 606. The processing resource 604 may fetch, decode, and execute the instructions stored in the storage medium 606. As an alternative or in addition to executing the instructions, the processing resource 604 may include at least one integrated circuit (IC), control logic, electronic circuits, or combinations thereof that include a number of electronic components. The storage medium 606 may be any electronic, magnetic, optical, or any other physical storage device that contains or stores instructions that are readable and executable by the processing resource 604. Thus, the storage medium 606 may be, for example, Random Access Memory (RAM), non-volatile RAM (NVRAM), an Electrically Erasable Programmable Read-Only Memory (EEPROM), a storage device, an optical disc, and the like. In some embodiments, the storage medium 606 may be a non-transitory storage medium, where the term "non-transitory" does not encompass transitory propagating signals. Further, the processing resource 604 may be connected to the photonic integrated circuit 500. In one example, the photonic integrated circuit 500 may act as an optical communication unit for the data generated and or received by the processing resource from outside the MCM 602.

Figure 7:
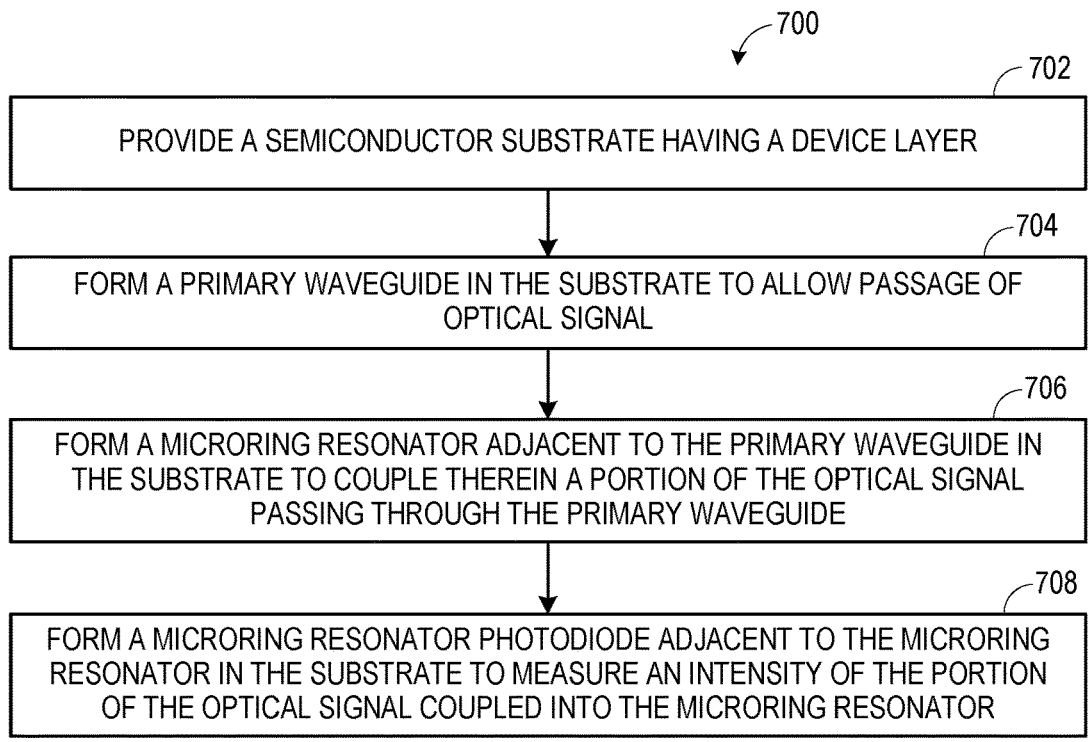
FIG. 7 is a flow diagram of an example method of forming an example optical resonating device.

Referring now to FIG. 7, a flow diagram of an example method 700 of forming an optical resonating device such as the optical resonating device 102 of FIG. 1 is presented. For illustration purposes, the method 700 is described in conjunction with FIG. 1. Although the steps depicted in FIG. 7 are shown in an order, the order of steps shown in FIG. 7 should not be construed as the only order for the steps. The steps may be performed at any time, in any order. Additionally, the steps may be repeated or omitted as needed.

At step 702, a semiconductor substrate such as the semiconductor substrate 109 may be provided. In some examples, the semiconductor substrate may be in the form of a semiconductor wafer. The semiconductor substrate includes a device layer in which one or more of the components of the optical resonating device may be formed. Further, at step 704, a primary waveguide, such as the primary waveguide 104, may be formed in the device layer. Forming the primary waveguide may include photolithographically defining the shape of the primary waveguide followed by etching a portion of the device layer according to the defined shape of the primary waveguide. During operation, an optical signal may be passed through the primary waveguide.

Further, at step 706, a microring resonator, for example, the microring resonator 106, may be formed adjacent to the primary waveguide. The microring resonator may be formed at such a place that allows the optical signal in the primary waveguide to be evanescently coupled into the microring resonator. Forming the microring resonator may include photolithographically defining the shape of the microring resonator followed by etching a portion of the device layer according to the defined shape of the primary waveguide. During operation, a portion of the optical signal passes through the primary waveguide. In particular, an optical signal having a wavelength equal to the resonant wavelength of the microring resonator is coupled into (i.e., trapped into) the microring resonator.

Furthermore, at step 708, a microring resonator photodiode, such as, the microring resonator photodiode 108 is formed adjacent to the microring resonator. Forming the microring resonator photodiode may include photolithographically defining the shape of the microring resonator photodiode followed by etching a portion of the device layer according to the defined shape of the microring resonator photodiode. The microring resonator photodiode may be formed at such a place that allows the optical signal in the microring resonator to be evanescently coupled into the microring resonator photodiode. In some examples, the microring resonator photodiode is formed to include an annular waveguide, such as the annular waveguide 107. In particular, in some examples, the dimensions of the microring resonator and the annular waveguide are kept the same so that the optical signal from the microring resonator is coupled into the microring resonator photodiode. During the operation, the PN junction in the microring resonator photodiode may be operated by applying a reverse bias voltage so as to generate a current indicative of the intensity of the light inside the microring resonator photodiode.

Figure 8:
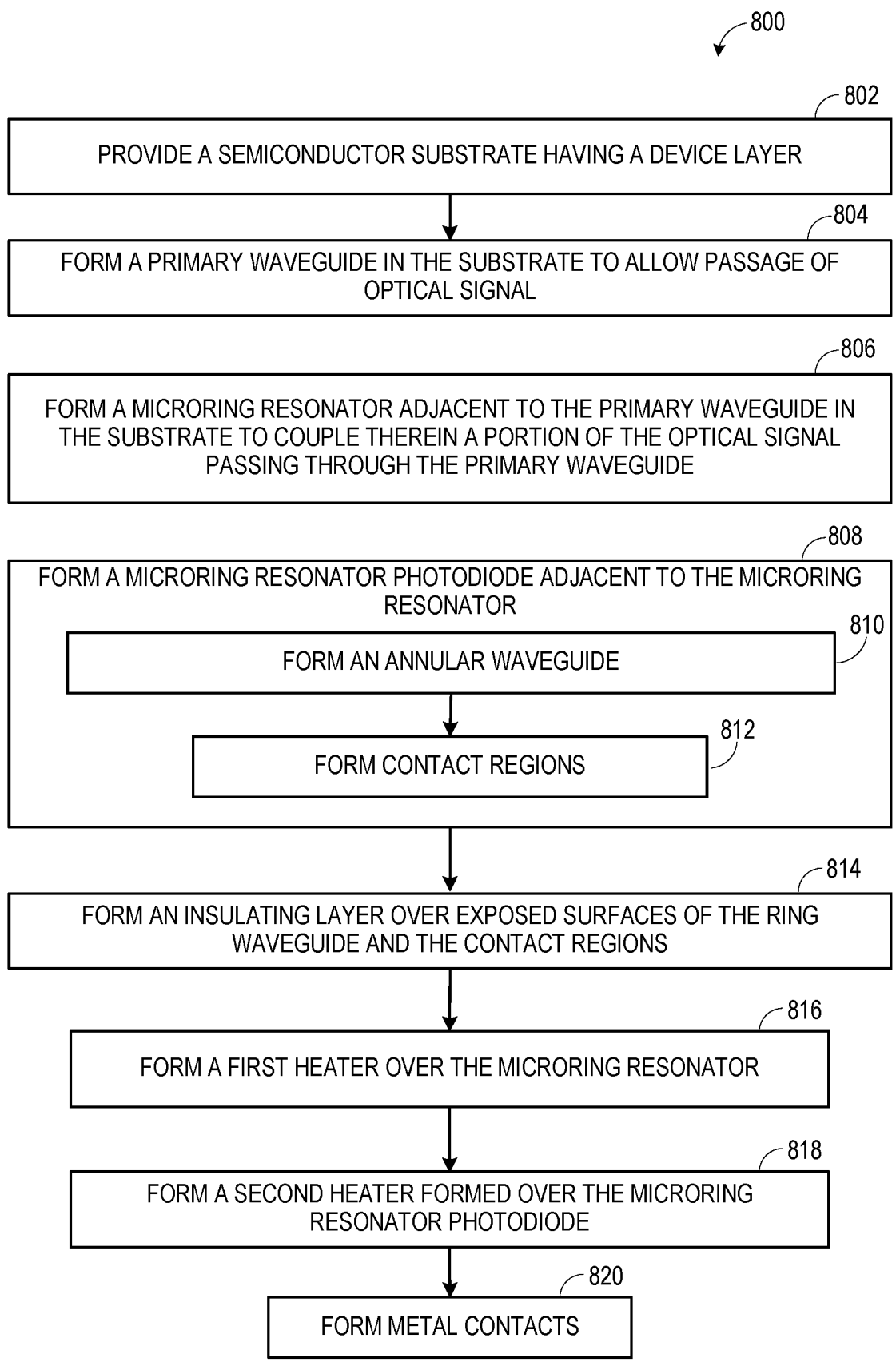
FIG. 8 is a flow diagram of another example method of forming an example optical resonating device.

Moving now to FIG. 8, an example method 800 for forming an optical device such as the optical resonating device 200 of FIGS. 2A-2B is presented. For illustration purposes, the method 800 is described in conjunction with FIGS. 2A-2B. Although the steps in FIG. 8 are shown in an order, the order of steps shown in FIG. 8 should not be construed as the only order for the steps. The steps may be performed at any time, in any order. Some steps may even be performed in parallel. Additionally, the steps may be repeated or omitted as needed.

At step 802, a semiconductor substrate such as the semiconductor substrate 209 may be provided. In some examples, the semiconductor substrate may be in the form of a semiconductor wafer. The semiconductor substrate includes a device layer, for example, the device layer 222 in which one or more of the components of the optical resonating device may be formed. Further, at step 804, a primary waveguide, such as the primary waveguide 204, may be formed in the device layer. Forming the primary waveguide may include photolithographically defining the shape of the primary waveguide followed by etching a portion of the device layer according to the defined shape of the primary waveguide. During operation, an optical signal may be passed through the primary waveguide. Further, at step 806, a microring resonator, for example, the microring resonator 206, may be formed adjacent to the primary waveguide. The microring resonator may be formed at such a place that allows the optical signal in the primary waveguide to be evanescently coupled into the microring resonator. Forming the microring resonator may include photolithographically defining the shape of the microring resonator followed by etching a portion of the device layer according to the defined shape of the primary waveguide.

Furthermore, at step 808, a microring resonator photodiode, such as, the microring resonator photodiode 208 is formed adjacent to the microring resonator. Forming the microring resonator photodiode may include photolithographically defining the shape of the microring resonator photodiode followed by etching a portion of the device layer according to the defined shape of the microring resonator photodiode. The microring resonator photodiode may be formed at such a place that allows the optical signal in the microring resonator to be evanescently coupled into the microring resonator photodiode. In some examples, forming the microring resonator photodiode may include performing steps 810 and 812. In particular, at step 810, an annular waveguide, such as, the PN junction annular waveguide 223 comprising a PN junction may be formed. The PN junction annular waveguide may be formed by forming an outer annular region (e.g., the first annular region 224) and an inner annular region (e.g., the second annular region 226). The outer annular region is formed in contact with and annularly surrounding the inner annular region. The outer annular region may be doped using ion implantation and/or diffusion techniques to have the first-type doping (e.g., p-type doping). Further, the inner annular region may be doped using ion implantation and/or diffusion techniques to have the second-type doping (e.g., n-type doping). In some examples, the contact between the annular regions defines a PN junction in the PN junction annular waveguide. In particular, in some examples, the dimensions of the microring resonator and the PN junction annular waveguide are kept the same so that the optical signal from the microring resonator is coupled into the microring resonator photodiode. During the operation, the PN junction in the microring resonator photodiode may be operated by applying a reverse bias voltage so as to generate a current, a magnitude of which is indicative of the intensity of the light inside the microring resonator photodiode.

Moreover, at step 812, contact regions such as the first contact region 232 (also referred to as an outer contact region) and the second contact region 234 (also referred to as an outer contact region) may be formed. In particular, the outer contact region and the inner contact region may be formed in the device layer 222 and along the outer and inner circumferences, respectively, of the waveguide core. In particular, the outer contact region is formed in contact with the outer annular region, and the inner contact region is formed in contact with the inner annular region. In particular, in some examples, forming the outer and inner contact regions may include lithographically defining areas corresponding to contact regions on the device layer, doping the lithographically defined areas with respective impurities, and/or etching-out portions of the device layer 222 to form predetermined shapes of the contact regions as depicted in FIGS. 2A and 2B. In particular, the contact regions may be doped respectively with the first-type doping and the second-type doping using the ion implantation and/or diffusion techniques.

Furthermore, in some examples, at step 814, an insulating layer, such as, the insulating layer 248, may be formed (e.g., grown or deposited) over exposed surfaces of the primary waveguide, the microring resonator, and the microring resonator photodiode and the contact regions. In some examples, to form the insulating layer 248, a layer of oxide (e.g., $SiO_2$, $Si_3N_4$, $Al_2O_3$, $HfO_2$, polyimide, BCB, or the like) may be formed, via thermal growth techniques and/or using deposition techniques, such as, chemical vapor deposition (CVD), over the exposed surfaces of the primary waveguide, the microring resonator, and the microring resonator photodiode and the contact regions.

Furthermore, in some examples, at step 816, a first heater, such as the first heater 236, may be formed over the microring resonator. The first heater may be operated to tune a resonant wavelength of the portion of the optical signal coupled into the microring resonator. Similarly, at step 818, a second heater, such as the second heater 238, may be formed over the microring resonator photodiode. The second metal may be operated to tune a wavelength of the portion of the optical signal coupled into the microring resonator photodiode. In some examples, the steps 816 and 818 may be performed in sequence or in parallel. In particular, to form the first and second heaters, an area where the heaters to be formed are lithographically defined and etched. Such etched space may then be filled with metal, such as, but not limited to, copper (Cu), gold (Au), Al, and/or platinum (Pt).

Additionally, at step 820, one or more metal contacts (e.g., the metal contacts 240, 242, 244A, 244B, 246A, and 246B)

may be formed. For example, the metal contacts 240, 242 are formed in contact with the contact regions 232 and 234, respectively. The metal contacts 244A, 244B may be formed in contact with the first heater 236, and the metal contacts 246A, 246B may be formed in contact with the second metal heater 238. To form the metal contacts 240, 242, 244A, 244B, 246A, and 246B the electrically insulating layer 248 may be etched or lithographically defined to form respective vias. Once the vias are formed, a conducting material (e.g., metal) is filled into the vias to form the metal contacts 240, 242, 244A, 244B, 246A, and 246B.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled to" as used herein, is defined as connected, whether directly without any intervening elements or indirectly with at least one intervening element, unless indicated otherwise. For example, two elements may be coupled to each other mechanically, electrically, optically, or communicatively linked through a communication channel, pathway, network, or system. Further, the term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described. Moreover, method steps described in various methods may be performed in series, parallel, or a combination thereof. Further, the method steps may as well be performed in a different order than depicted in flow diagrams.

Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. An optical resonating device, comprising:
    a primary waveguide to allow passage of an optical signal;
    a microring resonator formed adjacent to the primary waveguide to couple therein a portion of the optical signal passing through the primary waveguide;
    a microring resonator photodiode formed adjacent to the microring resonator to measure an intensity of the portion of the optical signal coupled into the microring resonator by measuring a current generated due to an avalanche breakdown in the microring resonator photodiode;
    a first heater formed over the microring resonator to tune a wavelength of the portion of the optical signal coupled into the microring resonator; and
    a second heater formed over the microring resonator photodiode to tune a light coupled into the microring resonator photodiode.

2. The optical resonating device of claim 1, wherein the primary waveguide, the microring resonator, and the microring resonator photodiode are formed using a single semiconductor base material.

3. The optical resonating device of claim 1, wherein the primary waveguide, the microring resonator, and the microring resonator photodiode are formed using Silicon.

4. The optical resonating device of claim 1, wherein the primary waveguide, the microring resonator, and the microring resonator photodiode do not comprise Germanium, a type III-V semiconductor material, or a combination thereof.

5. The optical resonating device of claim 1, wherein the primary waveguide and the microring resonator are undoped, and wherein the microring resonator photodiode comprises an annular waveguide, wherein the annular waveguide is operated with a reverse bias voltage.

6. The optical resonating device of claim 5, wherein the annular waveguide has the same dimensions as that of the microring resonator.

7. A photonic integrated circuit, comprising:
    an optical resonating device comprising:
        a primary waveguide to allow passage of an optical signal;
        a microring resonator formed adjacent to the primary waveguide to couple therein a portion of the optical signal passing through the primary waveguide; and
        a microring resonator photodiode formed adjacent to the microring resonator to measure an intensity of the portion of the optical signal coupled into the microring resonator;
        a first heater formed over the microring resonator to tune a wavelength of the portion of the optical signal coupled into the microring resonator; and
        a second heater formed over the microring resonator photodiode to tune a light coupled into the microring resonator photodiode; and
    a photonic controller coupled to the optical resonating device and configured to apply a reverse bias voltage to contact regions of the microring resonator photodiode and to measure a current generated due to an avalanche breakdown in the microring resonator photodiode, wherein the current is indicative of the intensity of the portion of the optical signal coupled into the microring resonator.

8. The photonic integrated circuit of claim 7, wherein the photonic integrated circuit is disposed in an electronic system.

9. The photonic integrated circuit of claim 8, wherein the electronic system is one of a server, a storage device, or an access point.

10. The photonic integrated circuit of claim 7, wherein the microring resonator photodiode comprises an annular waveguide, wherein the annular waveguide comprises a first annular region with N-type doping and a second annular region with P-type doping.

11. The photonic integrated circuit of claim 10, wherein the contact regions comprise a first contact region formed in contact with the first annular region, and a second contact region formed in contact with the second annular region, wherein the first contact region and the second contact region comprise higher doping concentration compared to the first annular region and the second annular region, respectively.

12. The photonic integrated circuit of claim 10, wherein the first annular region and the second annular region are formed in contact with each other to form a PN junction along an annulus of the annular waveguide.

13. The photonic integrated circuit of claim 12, wherein the reverse bias voltage causes an electric field of about $4.98 \times 10^7$ at the PN junction to induce the avalanche breakdown in the microring resonator photodiode.

14. The photonic integrated circuit of claim 10, wherein the microring resonator photodiode further comprises an intrinsic semiconductor region formed between the first annular region and the second annular region defining a P-I-N junction along an annulus of the annular waveguide.

15. The photonic integrated circuit of claim 7, wherein the reverse bias voltage is of a magnitude to cause impact ionization resulting in the avalanche breakdown in the microring resonator photodiode.

16. A method for fabricating an optical resonating device, comprising:
    providing a substrate;
    forming a primary waveguide in the substrate to allow passage of an optical signal;
    forming a microring resonator adjacent to the primary waveguide in the substrate to couple therein a portion of the optical signal passing through the primary waveguide; and
    forming a microring resonator photodiode adjacent to the microring resonator in the substrate to measure an intensity of the portion of the optical signal coupled into the microring resonator by measuring a current generated due to an avalanche breakdown in the microring resonator photodiode;
    forming a first heater over the microring resonator to tune a wavelength of the portion of the optical signal coupled into the microring resonator; and
    forming a second heater over the microring resonator photodiode to tune a light coupled into the microring resonator photodiode.

* * * * *